United States Patent [19]

Brittan

[11] Patent Number: 4,715,011

[45] Date of Patent: Dec. 22, 1987

[54] GRADE AVERAGING CALCULATOR

[76] Inventor: John L. Brittan, 1113 Brunn Ave., St. Joseph, Mich. 49085

[21] Appl. No.: 678,217

[22] Filed: Dec. 4, 1984

[51] Int. Cl.$^4$ .......................... G06F 3/00; G06F 7/00; G09B 7/00

[52] U.S. Cl. .................................... 364/734; 364/709; 364/710; 434/362

[58] Field of Search ............... 364/734, 709, 706, 710, 364/715, 419, 575, 411, 811, 900 MS File, 200 MS File; 434/191, 350, 351, 353, 336, 362

[56] References Cited

U.S. PATENT DOCUMENTS

| | | | |
|---|---|---|---|
| 3,470,368 | 9/1969 | Brittan | 434/362 |
| 3,783,257 | 1/1974 | Friedman et al. | 364/715 |
| 4,048,484 | 9/1977 | Brittan | 364/734 X |
| 4,118,783 | 10/1978 | Collins | 364/734 |
| 4,225,932 | 9/1980 | Hirano et al. | 364/419 X |
| 4,282,580 | 8/1981 | McGuire et al. | 364/734 |

Primary Examiner—Gary V. Harkcom
Assistant Examiner—Long Thanh Nguyen
Attorney, Agent, or Firm—Price, Heneveld, Cooper, DeWitt & Litton

[57] ABSTRACT

A calculator for use by teachers for rapidly and easily converting numeric scores into letter grades. The calculator includes a memory device for storing a user-defined set of numeric score ranges and the letter grades corresponding thereto. As individual student numeric scores are inputted, the calculator determines the range within which each numeric score lies and the letter grade corresponding thereto. In a preferred aspect, the score ranges are selectable by the user. In another preferred aspect, grade points are also calculated for the student numeric scores.

30 Claims, 5 Drawing Figures

GRADE AVERAGING CALCULATOR

BACKGROUND OF THE INVENTION

The present invention relates to calculators and more particularly to calculators for processing student grades.

Hand-held electronic calculators have been developed for averaging student letter grades. These calculators facilitate the grade averaging which teachers must periodically compute, for example to produce semester grades and course grades.

One particularly useful and efficient calculator is that disclosed in U.S. Pat. No. 4,048,484, issued Sept. 13, 1977, to the present inventor, and entitled DIGITAL GRADE AVERAGER. This calculator can be used either as a conventional calculator or as a grade averager. A plurality of dual function keys enables letter grades to be inputted to the calculator when in grade averaging mode. The calculator converts each inputted letter grade to a numeric value, sums and averages the numeric values, and reconverts the average numeric value to a final letter grade. Although constituting a significant advance in the field, this grade averager is capable of averaging only letter grades. The teacher must still create a grading curve for each test, exam, lab assignment, term paper, quiz, etc. in order to assign letter grades capable of being averaged in the calculator. Creating these grading curves is relatively time consuming and not infrequently difficult.

Another grade averaging calculator is disclosed in U.S. Pat. No. 4,282,580, issued Aug. 4, 1981, to McGuire et al, entitled POCKET CALCULATOR WITH GRADE AVERAGING FUNCTION. This calculator is also usable in either a standard calculator mode or a grade averaging mode. When in the grade averaging mode, only letter grades can be averaged. Consequently, this calculator suffers the disadvantages noted above.

SUMMARY OF THE INVENTION

The aforementioned problems are overcome in the present invention. Essentially, a calculator is provided enabling numeric scores to be rapidly and easily converted to letter grades. More particularly, in a first aspect the calculator includes means for storing maximum and minimum acceptable numeric scores, means for calculating numeric ranges corresponding to letter grades between the maximum and minimum scores, and means for determining the numeric range within which an inputted numeric score lies to determine the letter grade corresponding thereto. The calculator automatically establishes appropriate letter grades based on given maximum and minimum numeric scores. The teacher simply inputs the maximum and minimum scores into the calculator and thereafter inputs the individual student numeric scores. The calculator responds by assigning each numeric score a letter grade as determined by the internal grading curve or numeric ranges.

In a preferred embodiment of the first aspect, the calculator includes means enabling the user to manually override the calculated numeric ranges corresponding to each letter grade. This enables the calculator to accommodate nonlinear grading curves as required by certain states and/or parochial systems.

In a second aspect, the calculator rapidly and easily converts numeric scores to grade points. More particularly, the calculator includes means for storing maximum and minimum acceptable numeric scores, and means for calculating individual grade points by dividing the difference of the numeric score and the minimum score by the difference of the maximum score and minimum score and thereafter multiplying the quotient by the grade point standard. Again, the teacher need input only the maximum and minimum acceptable numeric scores and thereafter input individual numeric scores. The calculator calculates and displays the grade point corresponding to the numeric score.

These and other objects, advantages, and features of the invention will be more fully understood and appreciated by reference to the detailed description of the preferred embodiment and the drawings.

DETAILED DESCRIPTION OF THE PREFERRED EMBODIMENT

Figure 1:
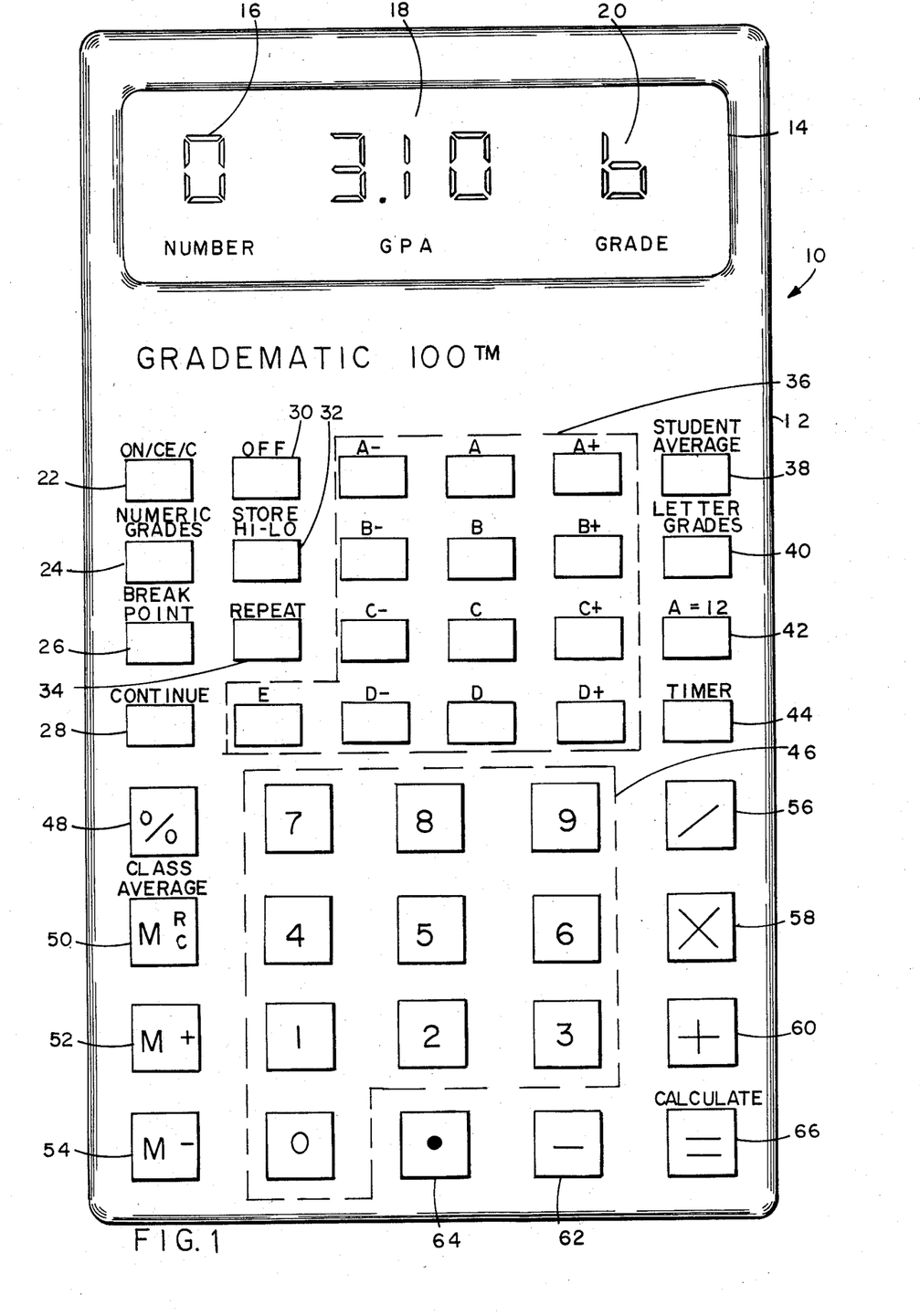
FIG. 1 is a plan view of the calculator of the present invention.

A calculator constructed in accordance with a preferred aspect of the invention is illustrated in FIG. 1 and generally designated 10. The calculator includes a body or housing 12 supporting a plurality of keys and a display 14. The display includes a number section 16, a GPA section 18, and a grade section 20 when operating in the grade averaging mode. When operating in the calculator mode, display 14 displays numbers in conventional fashion.

The keys supported within housing 12 are as follows:

TABLE 1

| Key | Designating Numeral |
| --- | --- |
| ON/CE/C | 22 |
| NUMERIC GRADES | 24 |
| BREAK POINT | 26 |
| CONTINUE | 28 |
| OFF | 30 |
| STORE HI-LO | 32 |
| REPEAT | 34 |
| Individual Letter Grades | 36 |
| STUDENT AVERAGE | 38 |
| LETTER GRADES | 40 |
| A=12 | 42 |
| TIMER | 44 |
| Individual Numbers | 46 |
| % | 48 |
| CLASS AVERAGE/MRC | 50 |
| M+ | 52 |
| M− | 54 |
| / | 56 |
| × | 58 |
| + | 60 |
| − | 62 |
| . | 64 |
| CALCULATE/= | 66 |

The function of these keys is explained in conjunction with the flow charts of FIGS. 2-5.

Main Routine

Figure 2:
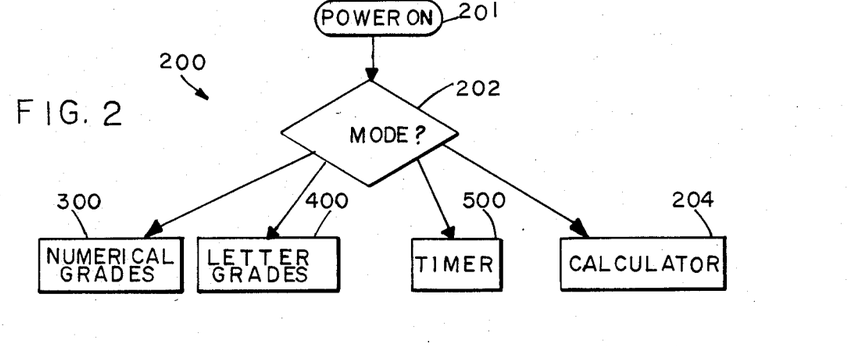
FIG. 2 is a flow chart illustrating the program flow of the "main" routine of the calculator.

Program flow of the main routine 200 is illustrated in FIG. 2. The calculator is powered on 201 by depressing ON/CE/C key 22. The calculator determines 202 the mode in which the calculator is to operate. The default mode is calculator mode 204. Depressing NUMERIC GRADES key 24 places the calculator in numeric grade mode 300. Depressing LETTER GRADES key 40 places the calculator in letter grade mode 400, and depressing TIMER key 44 places the calculator in timer mode 500. At any time during the operation of the calculator, any of keys 66, 24, 40, or 44 can be depressed whereupon the calculator enters the corresponding mode 204, 300, 400, or 500.

In describing the operation of the calculator, internal variables will be referred to which are summarized here for convenience:

| Variable | Description |
| --- | --- |
| CLAVG | Class average of GPA's |
| CLTOT | Class total of GPA's |
| GPA | Individual student grade point average |
| GPT | Individual student grade point total |
| LTR-GD | Letter grade |
| NO-GDS | Number of letter grades |
| NO-ST | Number of students |
| NUM-GD | Individual student numeric score |
| WF | Weight factor (look-up table) |

Numeric Grades Mode

Numeric grades subroutine 300 (FIG. 3) is entered 301 when NUMERIC GRADES key 24 is depressed. The calculator waits 302 for depression of the STORE HI-LO key 32. When the key is depressed, the number entered on display 14 is stored 304 as HI-SCORE within the calculator, and the calculator waits 306 for a second depression of the STORE HI-LO 32. When the key is again depressed, the number entered on display 14 is stored 308 as LO-SCORE, and the calculator automatically calculates break points. In the preferred embodiments, the break points are calculated automatically by dividing the difference between HI-SCORE and LO-SCORE divided by twelve. This establishes a numeric range for each of the twelve grades A+, A, A−, B+, B, B−, C+, C, C−, D+, D, and D−. For example, a HI SCORE of 100 and LO SCORE of 60 produces the following break points:

TABLE 2

| Letter Grade | Break Point |
| --- | --- |
| A+ | 96.6 |
| A | 93.3 |
| A− | 90.0 |
| B+ | 86.6 |
| B | 83.3 |
| B− | 80.0 |
| C+ | 76.6 |
| C | 73.3 |
| C− | 70.0 |
| D+ | 66.6 |
| D | 63.3 |
| D− | 60.0 |

Figure 3:
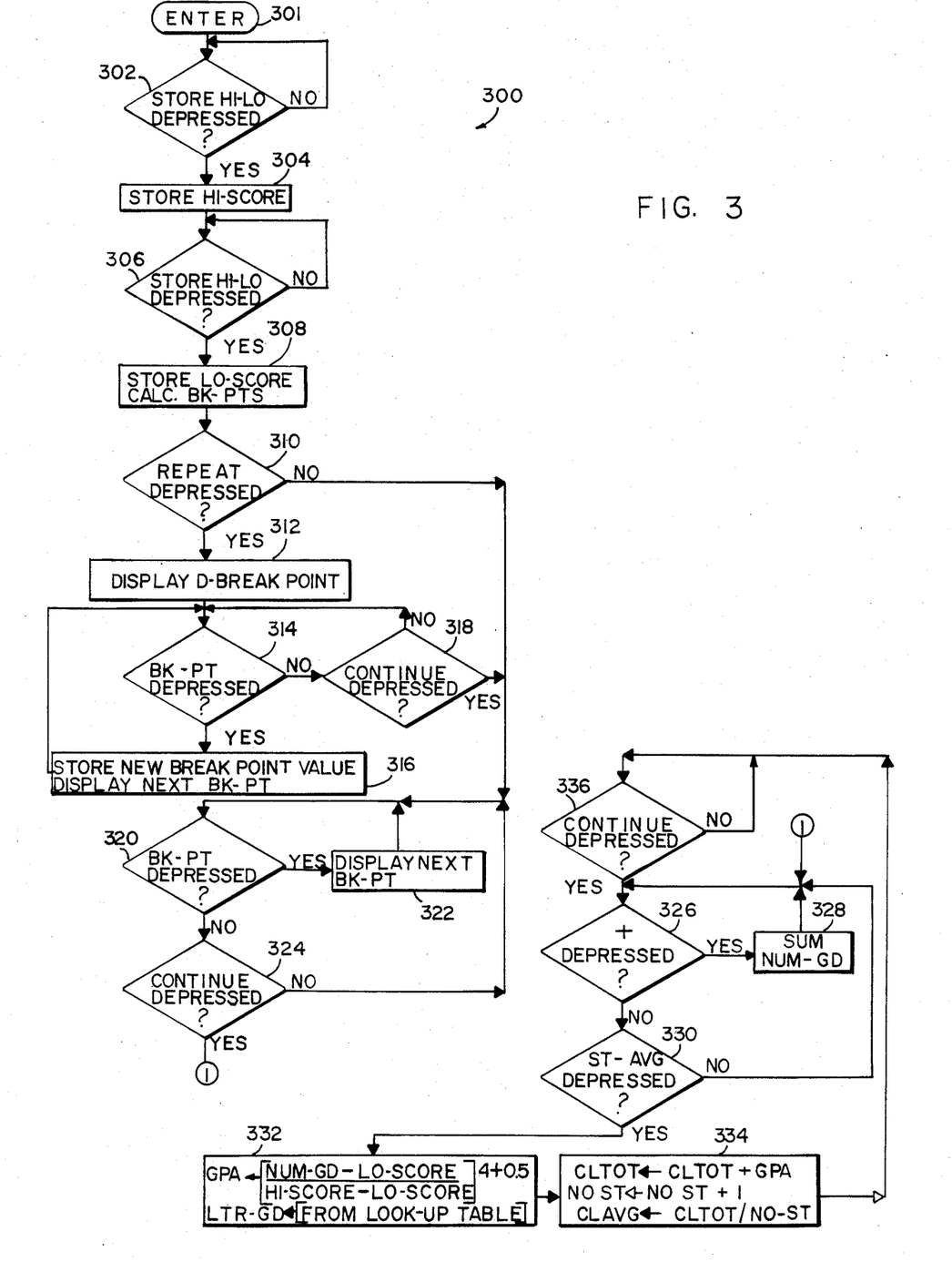
FIG. 3 is a flow chart illustrating the program flow of the "numeric grades" subroutine.

That is to say that a numeric grade of 60.0 or above will result in a D−; 63.3 or above will result in a D; 96.6 or above will result in an A+; and so forth.

The calculator includes an internal look-up table (not shown) for recording the break points associated with each of the twelve letter grades. After the break points are automatically calculated, the teacher can change any one or all of the break points using the REPEAT key 34. If the REPEAT key is depressed 310, the calculator displays 312 the first, or D−, break point with the break point value appearing in GPA field 18 and the associated letter grade appearing in grade field 20. If the BREAK POINT key 26 is thereafter depressed 314, the currently displayed break point value is replaced 316 with a new break point value inputted by the teacher. The next letter grade break point is then displayed and control returns to block 314. When the teacher is finished adjusting any necessary break points, the CONTINUE key 28 is depressed 318 whereupon program flow continues to block 320. Program flow also passes immediately to block 320 if the BREAK POINT key 26 is depressed before the REPEAT key 34 is depressed as tested at block 310.

If the BREAK POINT key 26 is depressed as tested at 320, the calculator displays 322 the next break point. If the BREAK POINT key 26 is not depressed 320, and the CONTINUE key is not depressed 324, the calculator continues to check the BREAK POINT and CONTINUE keys until it detects depression of one.

After the CONTINUE key is depressed as tested at 324, the calculator determines 326 whether the + key 60 is depressed thereafter. If so, the variable NUM-GD is updated with the value entered on display 14 and then displayed on the display. When STUDENT AVERAGE key 38 is depressed 330 before + key is depressed 326, flow passes to block 332 wherein the variables GPA and LTR-GD acquire values. GPA is given a value equal to the following equation:

$$\left[ \frac{(\text{NUM-GD}) - (\text{LO-SCORE})}{(\text{HI-SCORE}) - (\text{LO-SCORE})} \right] \times 4 + 0.5$$

LTR-GD acquires a letter grade value as determined in the look-up table based on GPA. The calculator determines which break point range the GPA falls into and assigns LTR-GD the letter grade corresponding to that range. The values GPA and LTR-GD are displayed on display 14 with GPA displayed in field 18 and LTR-GD displayed in field 20.

Program flow then passes to block 334 wherein class total variables are updated. CLTOT (class total) acquires the value CLTOT plus the present GPA. The NO-ST (number of students) variable is incremented, and the variable CLAVG (class average) acquires a value of CLTOT divided by NO-ST. Consequently the calculator internally maintains a class average automatically as the individual student grades are processed. The class average can be displayed at any time when the calculator is in the numeric grades mode by depressing CLASS AVERAGE key 50, whereupon NO-ST is displayed in field 16, CLAVG is displayed in field 18, and the letter grade corresponding thereto is displayed in field 20.

The depression 336 of CONTINUE key 28 enables the next student grade to be entered.

Letter Grades Subroutine

Figure 4:
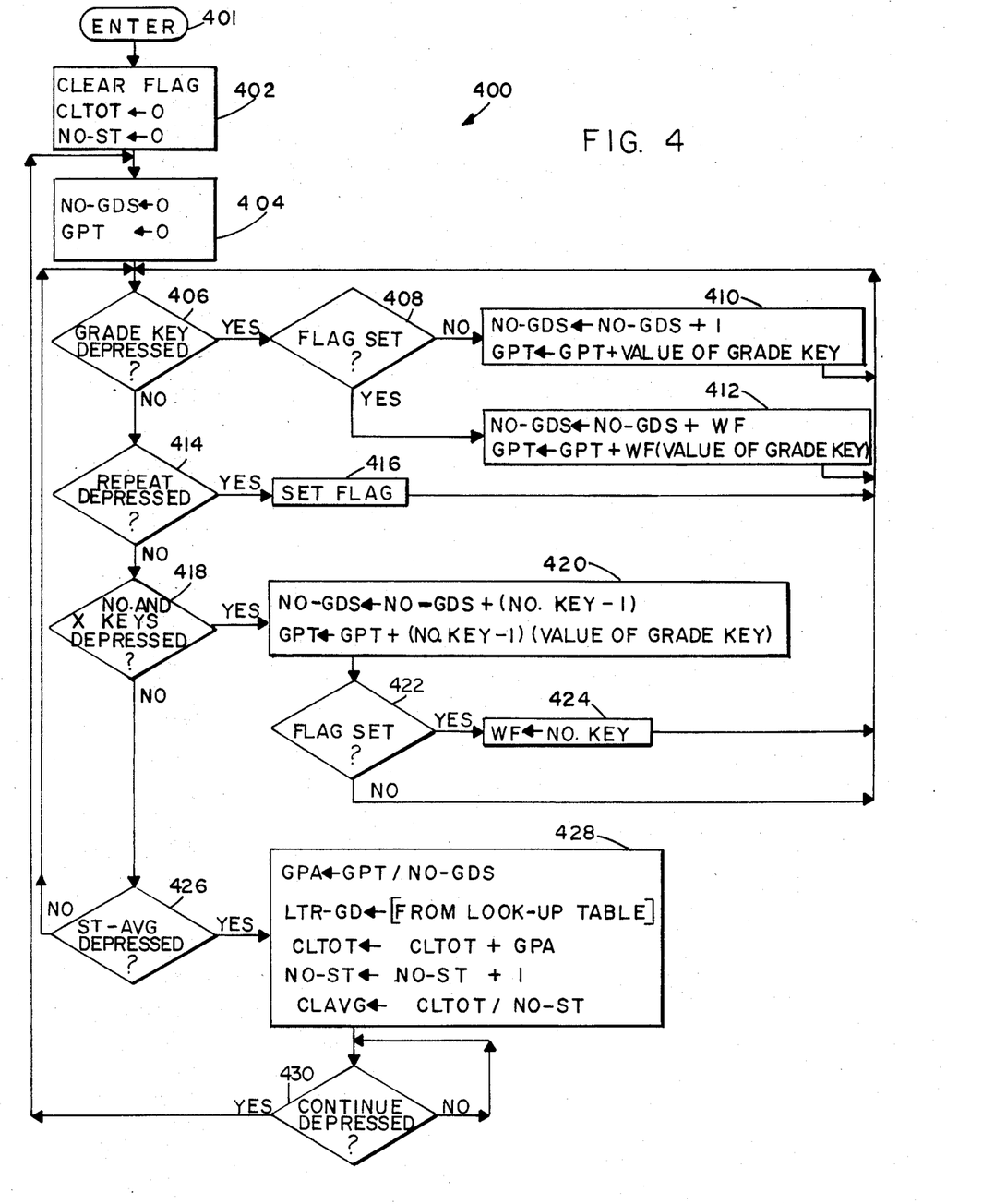
FIG. 4 is a flow diagram illustrating the program flow of the "letter grades" subroutine.

The depression of letter grades key 40 causes the calculator to enter letter grades subroutine 400 (FIG. 4). Upon entry 401, the logical variable FLAG is cleared 402, and the variables CLTOT and NO-ST for the class are initialized 402 to zero. Additionally, the variables NO-GDS and GPT for the student are also initialized 404 to zero. If any one of the grade keys 36 is depressed 406, the subroutine checks 408 to see if the logical variable FLAG is set. If FLAG is not set, NO-GDS is incremented 410, and the value of the grade key 36 is added 410 to GPT. The values corresponding to the letter grade keys 36 are as follows:

TABLE 3

| Key | Value |
|-----|-------|
| A+ | 4.33 |
| A | 4.00 |
| A− | 3.66 |
| B+ | 3.33 |
| B | 3.00 |
| B− | 2.66 |
| C+ | 2.33 |
| C | 2.00 |
| C− | 1.66 |
| D+ | 1.33 |
| D | 1.00 |
| D− | 0.66 |

If FLAG is set, NO-GDS and GPT are updated 412 as will be described. In either of cases 410 and 412, program flow returns to block 406.

If REPEAT key 34 is depressed 414, the logical variable FLAG is set 416. Program flow then returns to block 406.

If any one of numeric keys 46 and the x key 58 are depressed 418, the value of the numeric key minus one is added to the variable NO-GDS. Additionally, the value of the numeric key minus one is multiplied by the value of the most recently depressed grade key 36, and the product is added 420 to GPT. If FLAG is not set 422, flow returns immediately to block 406. If FLAG is set 422, the value of the numeric key 46 is stored in a look-up table WF (which stands for weight factor). Consequently, the look-up table WF acquires a history of the weight factors to be applied to each sequential grade entered for a particular student.

The look-up table WF greatly reduces the number of keystrokes required of the teacher in averaging letter grades when each letter grade is given a different weight. After the look-up table WF has been stored for the first student, the succeeding student's grades can be averaged according to the same weight factors simply by entering the grades in order. The appropriate WF from the look-up table is added 412 to NO-GDS, and this weight factor times the value of the grade key depressed is added 412 to GPT.

If STUDENT AVERAGE key 38 is depressed 426, the calculator averages the student grades and maintains a running class average all as indicated in block 428. Specifically, GPA acquires the value GPT divided by NO-GDS; LTR-GD acquires the appropriate letter grade from a look-up table based on GPA; the present value GPA is added to CLTOT; NO-ST is incremented; and CLAVG acquires the value CLTOT divided by NO-ST. NO-GDS, GPA, and LTR-GD are displayed on display 14 in areas 16, 18, and 20, respectively. After CONTINUE key 28 is depressed 430, program flow returns to block 404, wherein variables are reinitialized for the next student.

Timer Subroutine

Figure 5:
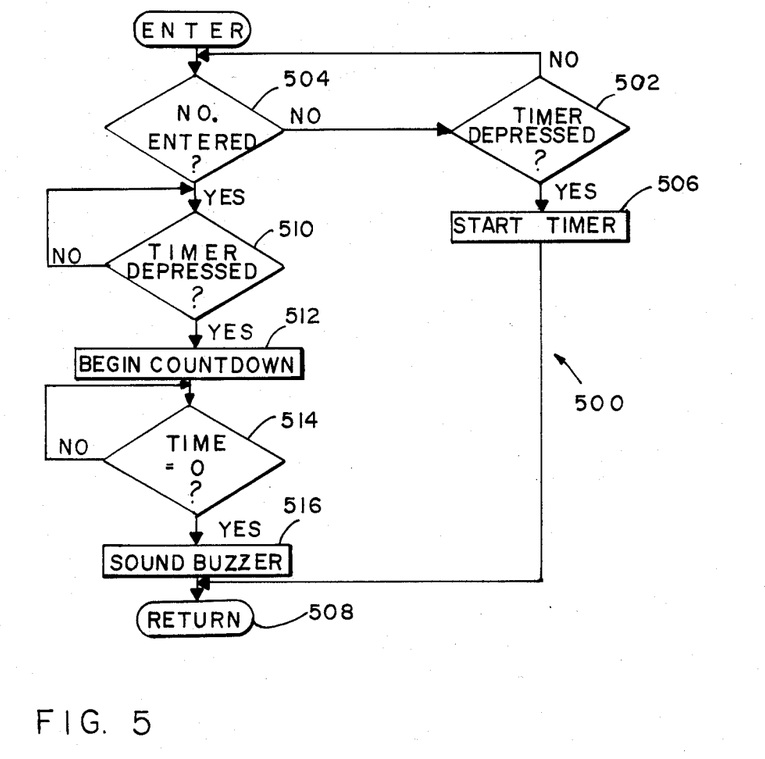
FIG. 5 is a flow diagram illustrating the program flow of the "timer" subroutine.

The depression of TIMER key 44 causes the calculator to enter timer subroutine 500 (FIG. 5). If TIMER key 44 is again depressed 502 before a number is entered 504, the calculator starts 506 an internal timer and displays the elapsed time on display 14 in minutes and seconds. Flow then passes back to main subroutine 200 through block 508.

If a number is entered 504 before TIMER key 44 is depressed 510, the calculator causes the internal timer to count down 512 from the time inputted 504. When the elapsed time has expired 514, a buzzer is sounded 516 and control returns to the main subroutine through block 508.

Consequently, the timer mode of the calculator enables the teacher to monitor elapsed time or to count down a specific time to facilitate test timing. When the calculator is operating in timer mode, a small capital "T" appears in the lower left corner of display 14 to remind the teacher that the timer is running. Further, while the calculator is in timer mode, it can simultaneously operate in numeric grade mode, letter grade mode, or calculator mode. The buzzer will sound when the time is elapsed regardless of the current mode of the calculator.

Operation

The present calculator easily and quickly converts numeric scores into grade points and/or letter grades. When numeric scores are to be so converted, the user first depresses ON/CE/C key 22 and then NUMERIC GRADE key 24. The maximum and minimum acceptable test scores are then entered using numeric keys 46 and STORE HI-LO key 32. Individual student scores are converted to letter grades by depressing CONTINUE key 28, entering the student's score using keys 46, and depressing STUDENT AVERAGE key 38.

As Example 1, a maximum score of 100 and minimum score of 60 establishes the break points listed above in Table 1 for the letter grades A+ through D−. The entry of the following numeric scores thereafter results in the display of the corresponding grade points and letter grades:

TABLE 4

| Entered Numeric Score | Grade Point | Letter Grade |
|-----------------------|-------------|--------------|
| 86 | 3.10 | B |
| 94 | 3.90 | A |
| 68 | 1.30 | D+ |
| 79 | 2.40 | C+ |
| 92 | 3.70 | A− |

The letter grades fall within the predefined break points automatically calculated based upon the maximum and minimum acceptable test scores.

As Example 2, a quiz having a maximum acceptable score of 34 and a minimum acceptable score of 20 results in the following break points:

TABLE 5

| Letter Grade | Break Point |
|--------------|-------------|
| A+ | 32.83 |
| A | 31.66 |
| A− | 30.50 |

TABLE 5-continued

| Letter Grade | Break Point |
| --- | --- |
| B+ | 29.33 |
| B | 28.16 |
| B− | 27.00 |
| C+ | 25.83 |
| C | 24.66 |
| C− | 23.50 |
| D+ | 22.33 |
| D | 21.16 |
| D− | 20.00 |

And accordingly, the entry of the following individual numeric scores results in the corresponding grade points and letter grades:

TABLE 6

| Entered Numeric Score | Grade Point | Letter Grade |
| --- | --- | --- |
| 18 | 0.45 | E |
| 29 | 3.07 | B |
| 23 | 1.35 | D+ |
| 33 | 4.21 | A+ |
| 23 | 1.35 | B+ |

In Example 3, the teacher has given the following items the indicated weight in establishing the semester grade:

TABLE 7

| Item | Point Worth |
| --- | --- |
| Paper | 15 points |
| Quiz | 25 points |
| Test | 50 points |
| Exam | 100 points |
| Total | 190 points |

The maximum score is therefore 190, and the minimum score is 114 (60% of 190). The scores are automatically totalled and assigned letter grades for each student by first, depressing CONTINUE key 28; second, entering the points earned for each item followed by depression of + key 60; and third, depressing STUDENT AVERAGE key 38. For example, the input of the following scores results in the following grade point and letter grade:

TABLE 8

| Paper | Quiz | Test | Exam | Total | Grade Point | Letter Grade |
| --- | --- | --- | --- | --- | --- | --- |
| 12 | 23 | 49 | 92 | 176 | 3.76 | A− |
| 5 | 16 | 32 | 68 | 121 | 0.86 | D |
| 0 | 12 | 27 | 49 | 88 | 0.38 | E |
| 7 | 21 | 35 | 74 | 137 | 1.71 | C− |
| 12 | 22 | 44 | 88 | 166 | 3.23 | B+ |

The calculator as thus far described operates on the normal four-point scale of letter grades as set forth in Table 3. However, the calculator can alternatively be operated in a twelve-point scale by depressing A=12 key 42. When depressed, the calculator operates according to the following twelve-point scale:

TABLE 9

| Letter Grade | Grade Point |
| --- | --- |
| A+ | 13 |
| A | 12 |
| A− | 11 |
| B+ | 10 |

TABLE 9-continued

| Letter Grade | Grade Point |
| --- | --- |
| B | 9 |
| B− | 8 |
| C+ | 7 |
| C | 6 |
| C− | 5 |
| D+ | 4 |
| D | 3 |
| D− | 2 |
| E+ | 1 |
| E | 0 |

Additionally, the calculator accommodates nonlinear scales, such as the following Florida scale:

TABLE 10

| Letter Grade | Numeric Score |
| --- | --- |
| A | 100–93 |
| B | 92–85 |
| C | 84–73 |
| D | 72–65 |
| E | Below 65 |

The calculator is used to assign letter grades to this scale by first entering the maximum acceptable score 100 and the minimum acceptable score 65 in the described fashion. The automatically calculated break points are examined and adjusted as necessary as described in conjunction with blocks 310, 312, 314, 316, and 318 (FIG. 3) to modify the break points such that the letter grades assigned to each numeric scale will conform to the nonlinear scale as modified or overridden by the teacher.

In an analogous fashion, the calculator can accommodate the following nonlinear Catholic grade scale:

TABLE 11

| Letter Grade | Numeric Score |
| --- | --- |
| A | 100–93 |
| B | 92–85 |
| C | 84–70 |
| D | 69–60 |
| E | Below 60 |

Letter grades are averaged by first placing the calculator in letter grade mode by depressing LETTER GRADES key 40. Letter grades are repeatedly entered simply by pressing the appropriate letter grade keys 36. Particular grades can be given extra emphasis by depressing the letter grade key, depressing the numeric keys 46 indicating the weight to be given that grade, and depressing x key 58. When all of the student's letter grades are entered, STUDENT AVERAGE key 38 is depressed whereupon the student's average letter grade and grade point average are displayed on display 14. The cumulative class average can be displayed at any time by depressing CLASS AVERAGE key 50.

The weighting pattern to be assigned letter grades can be inputted once during the averaging of the first student's grades for subsequent automatic weighting of the succeeding student's grades. When a weighting pattern is to be stored in the internal look-up table WF, the teacher depresses REPEAT key 34 prior to entering the first student's letter grades. Thereafter, the student's grades are entered and modified weight-wise as desired using numeric keys 36 and x key 58. The weights assigned to each sequential grade are memorized internally in the look-up table WF. After the first student's grades are averaged, the next student's letter grades are averaged by inputting the letter grades only. The calculator will internally assign the sequential grades the same weight as the corresponding grades received in the first student's scores. The number of key strokes required to average the second and succeeding students' grades are therefore greatly reduced.

The calculator can be operated as a timer as described above by depressing TIMER key 44.

Finally, the calculator can be operated as a standard pocket calculator by depressing CALCULATE key 64.

The present calculator can be operated in any one of four modes (1) to convert numeric scores to grade points and/or letter grades, (2) to average letter grades, (3) to time events such as tests, or (4) to operate as a standard calculator. When converting numeric grades to letter grades, the calculator automatically establishes a grading scale and associated letter grades based simply upon the inputted maximum and minimum acceptable numeric scores. The automatically calculated numeric ranges assigned to each letter grade can be overridden by the teacher to accommodate nonlinear grading scales or any other grading scale that the teacher desires. When operating in the numeric grade mode, a plurality of numeric grades for a particular student can be summed before the letter grade is assigned. The letter grade averaging, timer, and calculator functions enhance the versatility of the calculator and its ease of operation.

The above description is that of a preferred embodiment of the invention. Various changes and alterations can be made without departing from the spirit and broader aspects of the invention as set forth in the appended claims, which are to be interpreted in accordance with the principles of patent law, including the doctrine of equivalents.

I claim:

1. A calculator for use by teachers for converting numeric scores into student letter grades comprising:
   means for inputting a high numeric standard and a low numeric standard;
   means for calculating numeric ranges between said high and low numeric standards, each of said ranges corresponding to a letter grade;
   means for inputting a student numeric score;
   means for determining the numeric range encompassing the student numeric score and for determining the corresponding student letter grade; and
   display means for displaying the corresponding student letter grade.

2. A calculator as defined in claim 1 wherein each of the numeric ranges are of generally equal length.

3. A calculator as defined in claim 1 wherein said display means includes means for displaying numbers indicative of the numeric ranges, enabling the teacher to review same.

4. A calculator as defined in claim 1 wherein said student score inputting means includes means for inputting several numeric scores for a student, and wherein said calculator further comprises means for summing the several numeric scores.

5. A calculator as defined in claim 4 wherein said display means further includes means for displaying the number of scores inputted for a student.

6. A calculator as defined in claim 1 wherein said calculating means includes means for dividing the difference between the high and low numeric scores by a number of letter grades between the high and low numeric scores.

7. A calculator as defined in claim 1 further comprising means for manually inputting numbers modifying the numeric ranges.

8. A calculator as defined in claim 1 further comprising timer means for counting down from a preselected time and emitting a signal when said preselected time has elapsed.

9. A calculator as defined in claim 1 wherein said determining means includes means for determining a grade point for each student numeric score, and wherein said display means includes means for displaying the grade point.

10. A calculator as defined in claim 9 further comprising means for averaging a plurality of letter grades to produce an overall letter grade.

11. A calculator as defined in claim 1 further comprising means for averaging a plurality of letter grades to produce an overall letter grade.

12. A calculator as defined in claim 11 wherein said letter grade averaging means includes storage means for storing weighting factors to be applied to sequentially entered letter grades.

13. A calculator for use by teachers for converting student numeric scores into student grade points, said calculator comprising:
   means for inputting a maximum acceptable numeric score and a minimum acceptable numeric score;
   means for storing a grade point standard indicative of the number of grade points awarded a letter grade "A";
   means for inputting individual student numeric scores;
   means for calculating an individual student grade point for each individual student numeric score by at least calculating $$\left[\frac{a-b}{c-b}\right]d$$

where:
   a = the individual student numeric score
   b = the minimum numeric score
   c = the maximum numeric score
   d = the grade point standard
   and
   means for displaying the individual student grade point.

14. A calculator as defined in claim 13 further comprising means for determining a letter grade corresponding to each grade point, and wherein said display means includes means for displaying the letter grade.

15. A calculator as defined in claim 14 wherein said letter grade determining means includes means for calculating a plurality of numeric ranges between said maximum and minimum scores and means for assigning a letter grade to each numeric range.

16. A calculator as defined in claim 14 wherein said letter grade determining means includes look-up table means for storing a plurality of numeric ranges and a letter grade corresponding to each range.

17. A calculator as defined in claim 16 wherein said display means includes means for displaying the numeric ranges enabling the teacher to insure that same are accurately stored.

18. A calculator as defined in claim 13 further comprising timer means for counting down a preselected time period and sounding an alarm when the period is expired.

19. A calculator as defined in claim 13 further comprising means for summing a plurality of numeric scores for each individual student.

20. A calculator as defined in claim 13 further comprising means for averaging a plurality of letter grades.

21. A calculator as defined in claim 20 wherein said letter grade averaging means includes storage means for storing weighting factors to be applied to sequentially entered letter grades.

22. A calculator for use by teachers for converting numeric scores into letter grades comprising:
    means for establishing a plurality of numeric ranges each corresponding to a letter grade;
    look-up table means for storing the numeric ranges and the corresponding letter grades;
    means for inputting individual student numeric scores;
    means for consulting said look-up table to determine in which numeric range the student numeric score falls and the corresponding letter grade; and
    means for displaying the corresponding student letter grade.

23. A calculator as defined in claim 22 wherein said range establishing means includes means for inputting high and low scores and means for calculating the numeric ranges between said high and low scores.

24. A calculator as defined in claim 23 wherein each of the numeric ranges is of generally equal length.

25. A calculator as defined in claim 23 wherein said range inputting means further includes means for overriding selected ones of the calculated numeric ranges enabling the teacher to redefine the ranges.

26. A calculator as defined in claim 22 wherein said display means further includes means for selectively displaying numbers indicative of the stored numeric ranges.

27. A calculator as defined in claim 22 further comprising means for averaging a plurality of letter grades.

28. A calculator as defined in claim 27 wherein said letter grade averaging means includes storage means for storing weighting factors to be applied to sequentially entered letter grades.

29. A calculator as defined in claim 22 further comprising means for summing a plurality of numeric scores for each student.

30. A calculator as defined in claim 22 further comprising timer means for counting down a preselected time interval and sounding an alarm when said interval has expired.

* * * * *